United States Patent Office 3,155,684  
Patented Nov. 3, 1964

3,155,684  
OPTIONALLY 17α-ALKYLATED 17β-(SUBSTITUTED-OXY)-2-OXA-5α-ANDROSTAN-3-ONES  
Raphael Pappo, Skokie, Ill., assignor to G. D. Searle & Co., Chicago, Ill., a corporation of Delaware  
No Drawing. Filed Oct. 29, 1962, Ser. No. 233,919  
12 Claims. (Cl. 260—343.2)

The present invention relates to novel steroids possessing a substituted-oxy group at the 17-position, wherein the substituent is characterized by a cyclic structure optionally containing a heteroatom, an alkoxy substituent, or a point of unsaturation, or characterized by an alkoxygenated alkyl radical. These substances can be represented by the structural formula

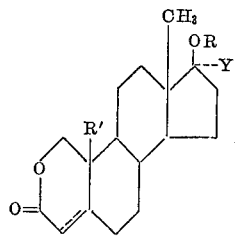

wherein R can be a lower cycloalkyl, lower cycloalkenyl, tetrahydropyranyl, 1-(lower alkoxy)cycloalkyl, [1,1-di-(lower alkoxy)lower alkyl], or [1-(lower alkoxy)lower alkyl] radical, Y is hydrogen or a lower alkyl radical, R' is hydrogen or a methyl radical, and the dotted line indicates the optional presence of a 4,5-double bond. Those compounds possessing a cycloalkenyl, tetrahydropyranyl, 1-alkoxycycloalkyl, or alkoxygenated alkyl group are characterized by their unusual ease of hydrolysis to afford the corresponding 17-hydroxy compounds.

Examples of lower cycloalkyl radicals are cyclopentyl and cyclohexyl, while the cycloalkenyl groups are typified by cyclopentenyl adn cyclohexenyl. Representative of the lower alkoxy radicals indicated above are methoxy, ethoxy, propoxy, butoxy, pentoxy, hexyloxy, and the branched-chain groups isomeric therewith. The lower alkyl radicals encompassed by the R and X terms in the foregoing formula are exemplified by methyl, ethyl, propyl, butyl, pentyl, hexyl, and the branched-chain isomers thereof.

The compounds of the present invention are conveniently obtained by processes utilizing as starting materials compounds of the structural formula

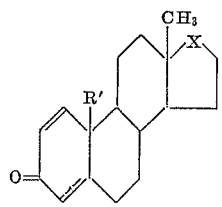

wherein X is a carbonyl, β-hydroxymethylene, or α-(lower alkyl)-β-hydroxymethylene radical, R' is hydrogen or a methyl radical, and the dotted line indicates the optional presence of a 4,5-double bond. Those substances are contacted with a suitable oxidizing reagent, such as a mixture of osmium tetroxide and lead tetracetate, to produce the corresponding 1,2-seco-A-nor-compounds.

The reduction of these intermediates, typically with sodium borohydride in aqueous sodium hydroxide affords the optionally 17-alkylated 17β-hydroxy-2-oxa-3-ones of the structural formula

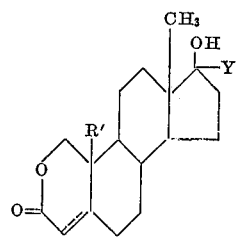

wherein Y is hydrogen or a lower alkyl radical, R' can be hydrogen or a methyl radical, and the dotted line indicates the optional presence of a 4,5-double bond. These processes are specifically illustrated by the reaction of 5α-androst-1-ene-3,17-dione with osmium tetroxide and lead tetracetate in aqueous acetic acid to yield 1,17-dioxo-1,2-seco-A-nor-5α-androstan-2-oic acid and the reduction of that substance with sodium borohydride in aqueous sodium hydroxide, resulting in 17β-hydroxy-2-oxa-5α-androstan-3-one.

The 1-(lower alkoxy)cycloalkyl compounds of this invention are obtained by contacting the aforementioned 2-oxa-3-ones with the appropriate cycloalkanone ketal at room temperature in the presence of an acidic catalyst. As a specific example, the above-described 17β-hydroxy-2-oxa-5α-androstan-3-one is allowed to react with cyclopentanone diethyl ketal in the presence of p-toluenesulfonic acid to produce 17β-[1-ethoxycyclopentyl)oxy]-2-oxa-5α-androstan-3-one. When this process is conducted at an elevated temperature in the presence of a suitable solvent, on the other hand, the instant 17-cycloalkenyloxy compounds result. Thus, reaction at elevated temperature of the latter identical reactants in benzene produces 17β - cyclopent - 1' - enyloxy - 2 - oxa - 5α - androstan - 3 - one.

When the intermediate 2-oxa-3-ones are contacted with dihydropyran, the corresponding 17-tetrahydropyranyloxy compounds result. The reaction of 17β-hydroxy-17α-methyl-2-oxa-5α-androstan-3-one, for example, with dihydropyran and a catalytic quantity of p-toluenesulfonic acid in benzene at room temperature affords 17α-methyl-17β-tetra-hydropyranyloxy-2-oxa-5α-androstan-3-one.

The cycloalkyloxy compounds of this invention can be produced by two alternative processes. The intermediate 17-hydroxy compound may be allowed to react with the appropriate cycloalkyl iodide in the presence of silver carbonate. Thus, reaction of the aforementioned 17β-hydroxy-2-oxa-5α-androstan-3-one with cyclopentyl iodide and silver carbonate yields 17β-cyclopentyloxy-2-oxa-5α-androstan-3-one. The alternate process involves catalytic hydrogenation of the corresponding 17-cycloalkenyl compounds. For example, the above-described 17β-cyclopent-1'-enyloxy-2-oxa-5α-androstan-3-one is shaken with hydrogen in the presence of a palladium-on-alumina catalyst to afford the identical 17β-cyclopentyloxy-2-oxa-5α-androstan-3-one.

The [1,1-di-(lower alkoxy)lower alkoxy] compounds of the present invention are manufactured by reaction of the aforementioned 2-oxa-3-ones with an ortho ester. As a specific example, 17β-hydroxy-2-oxa-5α-androstan-3-one is contacted with ethyl orthoformate and p-toluenesulfonic acid at room temperature to produce 17β[(diethoxy)methoxy]-2-oxa-5α-androstan-3-one.

The reaction of the 17-oxygenated 2-oxa-3-one intermediates with an acetal in the presence of an acidic catalyst results in the [1-(lower alkoxy)lower alkoxy] compounds of this invention. Typically, the aforementioned 17β-hydroxy-2-oxa-5α-androstan-3-one is contacted with acetaldehyde diethyl acetal in the presence of a catalytic quantity of p-toluenesulfonic acid, resulting in 17β-[(1-ethoxy)ethoxy]-2-oxa-5α-androstan-3-one.

The compounds of this invention display valuable pharmacological properties. They are hormonal agents, for example, in view of their androgenic and anabolic activities of especial potency when administered orally.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

*Example 1*

To a solution of 8 parts of 5α-androst-1-ene-3,17-dione in 120 parts of acetic acid containing 15 parts of water is added 50 parts of lead tetracetate and 0.75 part of osmium tetroxide. This reaction mixture is stirred for about 4 hours at room temperature, then is stored at room temperature for about 16 hours, and finally is extracted with benzene. The benzene solution is washed with water and extracted with aqueous potassium bicarbonate. The aqueous extracts are acidified with dilute hydrochloric acid, then extracted with a mixture of ethyl acetate and benzene. This organic extract is washed with water, dried over anhydrous sodium sulfate, and evaporated to dryness at reduced pressure. The resulting residue is dissolved in 20 parts of pyridine, then is treated with 10 parts of 20% aqueous sodium bisulfite. This mixture is stirred for about 20 minutes at room temperature, then is diluted with water and extracted with ethyl acetate. The aqueous layer is separated and acidified by means of dilute sulfuric acid, and this acidic mixture is extracted with benzene. The benzene solution is washed with water, dried over anhydrous sodium sulfate, and concentrated to dryness in vacuo to afford 1,17-dioxo-1,2-seco-A-norandrostan-2-oic acid.

To a solution of 2 parts of 1,17-dioxo-1,2-seco-A-norandrostan-2-oic acid in 20 parts of water containing 4 parts of 20% aqueous sodium hydroxide is added a solution of 10 parts of sodium borohydride in 80 parts of water. This mixture is stored at room temperature for about 24 hours, then is washed with ether and acidified with aqueous hydrochloric acid. The resulting mixture is extracted with ethyl acetate-ether, and the organic layer is separated, washed successively with aqueous potassium carbonate and water, dried over anhydrous sodium sulfate, then evaporated to dryness at reduced pressure. The crystalline residue is triturated with ether, then recrystallized from butanone to afford pure 17β-hydroxy-2-oxa-5α-androstan-3-one, M.P. about 198–203°.

*Example 2*

To a solution of 6.36 parts of 17β-hydroxy-17α-methyl-5α-androst-1-en-3-one in 95 parts of acetic acid and 12 parts of water is added 40 parts of lead tetracetate and 0.6 part of osmium tetroxide. This mixture is stored at room temperature for about 24 hours, then is treated with 2 parts of lead tetracetate. Evaporation to dryness at reduced pressure affords a residue, which is extracted with benzene. The benzene extract is washed with water and extracted with aqueous potassium bicarbonate. The aqueous extract is washed with ether, acidified with dilute sulfuric acid, then extracted with ethyl acetate-benzene. This organic extract is washed with water, dried over anhydrous sodium sulfate, and concentrated to dryness in vacuo. To a solution of the residual crude product in 20 parts of pyridine is added 10 parts of 20% aqueous sodium bisulfite and the mixture is stirred for about 20 minutes at room temperature. This mixture is then diluted with water, washed with ethyl acetate, acidified with dilute sulfuric acid, and finally extracted with benzene. The benzene extract is washed with water, dried over anhydrous sodium sulfate, and evaporated to dryness at reduced pressure to produce crude 17β-hydroxy-17α-methyl - 1 - oxo-1,2-seco-A-nor-5α-androstan-2-oic acid, which after recrystallization from aqueous isopropyl alcohol, melts at about 166–173° (dec.).

An aqueous slurry of 6 parts of 17β-hydroxy-17α-methyl-1-oxo-1,2-seco-A-nor-5α - androstan - 2 - oic acid in 200 parts of water is made alkaline to pH 10 by the addition of dilute aqueous sodium hydroxide, then is treated with 6 parts of sodium borohydride. This mixture is allowed to react at room temperature for about 3 hours. Benzene is added and the resulting mixture is acidified carefully with dilute hydrochloric acid. The benzene layer is separated and the aqueous layer is further extracted with benzene. The combined benzene extracts are washed successively with aqueous potassium bicarbonate and water, dried over anhydrous sodium sulfate, then evaporated to dryness in vacuo. The resulting residue is triturated with ether to afford pure 17β-hydroxy-17α-methyl-2-oxa-5α-androstan-3-one, M.P. about 235–238°; $[α]_D = -23°$ (chloroform).

*Example 3*

The substitution of an equivalent quantity of 17α-ethyl-17β-hydroxy-5α-androst-1-en-3-one in the process of Example 2 results in 17α-ethyl-17β-hydroxy-1-oxo-1,2-seco-A-nor-5α-androstan-2-oic acid and 17α-ethyl-17β-hydroxy-2-oxa-5α-androstan-3-one, M.P. about 192–195°.

*Example 4*

To a solution of 2.9 parts of 17β-hydroxy-2-oxa-5α-androstan-3-one in 28 parts of dry benzene and 9.2 parts of dihydropyran is added 0.09 part of p-toluenesulfonic acid monohydrate, and the resulting reaction mixture is stirred at room temperature for about 3 hours. At the end of that time, the mixture is made alkaline by the addition of dilute aqueous potassium bicarbonate, and the organic layer is separated, washed with water, and dried over anhydrous sodium sulfate. Evaporation of the solvent at reduced pressure affords a gummy residue which is recrystallized from hexane to yield pure 17β-tetrahydropyranyloxy-2-oxa-5α-androstan - 3 - one, melting at about 160–162°. This compound is represented by the structural formula

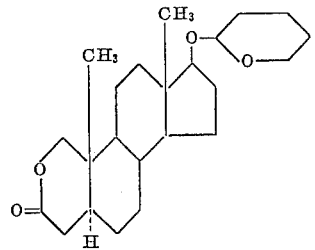

*Example 5*

The substitution of 3 parts of 17β-hydroxy-17α-methyl-2-oxa-5α-androstan-3-one in the procedure of Example 4 results in a crude product which is purified by trituration with hexane followed by recrystallization from acetone to afford 17α-methyl-17β-tetrahydropyranyloxy - 2 - oxa - 5α- androstan-3-one, melting at about 211–214° and characterized further by the structural formula

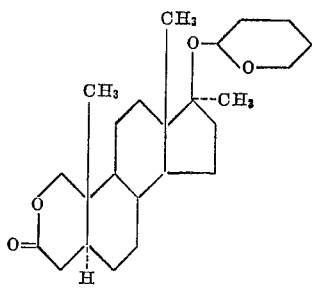

*Example 6*

By substituting 3.2 parts of 17α-ethyl-17β-hydroxy-2-oxa-5α-androstan-3-one and otherwise proceeding according to the processes described in Example 4, 17α-ethyl-17β-tetrahydropyranyloxy-2-oxa-5α - androstan - 3 - one is obtained. This substance is represented by the structural formula

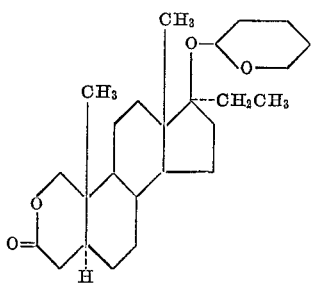

*Example 7*

A mixture of one part of 17β-hydroxy-2-oxa-5α-androstan-3-one, 18 parts of cyclopentanone diethyl ketal, and 0.1 part of p-toluenesulfonic acid monohydrate is stirred at room temperature for about 16 hours, then is made alkaline by the addition of 3.65 parts of triethylamine. Ether is added, and the resulting organic solution is washed successively with aqueous potassium bicarbonate and water, dried over anhydrous sodium sulfate and stripped of solvent at reduced pressure to yield 17β-[(1-ethoxycyclopentyl)oxy]-2-oxa-5α-androstan-3-one as a low-melting solid. It is represented by the structural formula

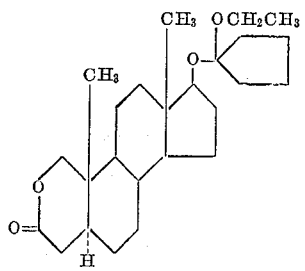

*Example 8*

The substitution of 16.4 parts of cyclohexanone dimethyl ketal in the procedure of Example 7 results in 17β - [(1-methoxycyclohexyl)oxy]-2-oxa-5α-androstan-3-one, represented by the structural formula

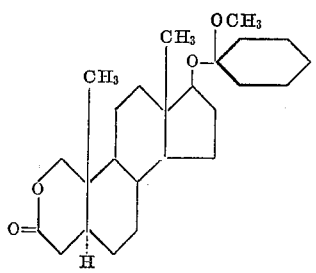

*Example 9*

The substitution of 1.05 parts of 17β-hydroxy-17α-methyl-2-oxa-5α-androstan-3-one in the procedure of Example 7 affords 17β-[(1-ethoxycyclopentyl)oxy]-17α-methyl - 2 - oxa - 5α - androstan - 3 - one of the structural formula

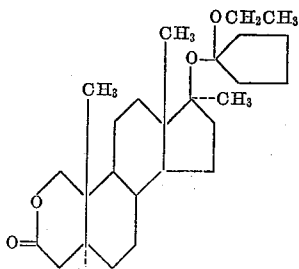

*Example 10*

The reaction of 1.05 parts of 17β-hydroxy-17α-methyl-2-oxa-5α-androstan-3-one and 16.4 parts of cyclohexanone dimethyl ketal according to the procedure of Example 7 results in 17β-[(1-methoxycyclohexyl)oxy]-17α-methyl-2-oxa-5α-androstan-3-one of the structural formula

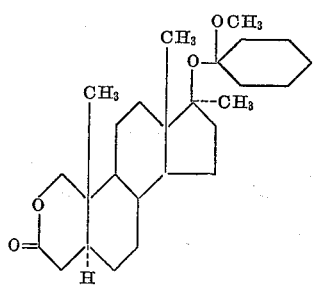

*Example 11*

By substituting 1.1 parts of 17α-ethyl-17β-hydroxy-2-oxa-5α-androstan-3-one and otherwise proceeding according to the processes described in Example 7, 17α-ethyl-17β - [(1 - ethoxycyclopentyl)oxy]-2-oxa-5α-androstan-3-one of the structural formula

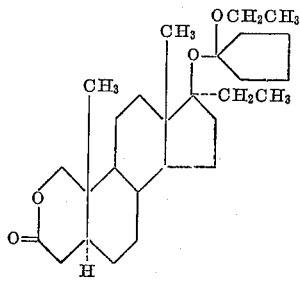

is obtained.

*Example 12*

The reaction of 1.1 parts of 17α-ethyl-17β-hydroxy-2-oxa-5α-androstan-3-one with 16.4 parts of cyclohexanone dimethyl ketal by the procedure described in Example 7 results in 17α-ethyl-17β-[(1-methoxycyclohexyl)oxy]-2-oxa-5α-androstan-3-one. This substance is represented by the structural formula

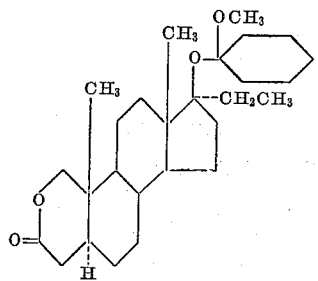

Example 13

To a mixture of 3 parts of 17β-hydroxy-2-oxa-5α-androstan-3-one, 220 parts of benzene, and 0.1 part of p-toluenesulfonic acid monohydrate is added 45 parts of cyclopentanone diethyl ketal. The resulting reaction mixture is distilled slowly in an atmosphere of nitrogen for about 2 hours, then is cooled and made alkaline by the addition of 7.3 parts of triethylamine. Dilution of the alkaline mixture with benzene affords an organic solution which is washed successively with dilute aqueous sodium hydroxide and water, then dried over anhydrous sodium sulfate and stripped of solvent at reduced pressure. The resulting residue is recrystallized from methanol containing 2% of triethylamine to afford 17β-cyclopent-1'-enyloxy-2-oxa-5α-androstan-3-one, melting at about 155–157.5°. This compound is represented by the structural formula

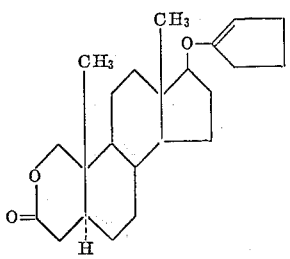

Example 14

By substituting 3.28 parts of 17α-ethyl-17β-hydroxy-2-oxa-5α-androstan-3-one and otherwise proceeding according to the process of example 13, 17β-cyclopent-1' - enyloxy - 17α - ethyl - 2 - oxa - 5α - androstan - 3 - one of the structural formula

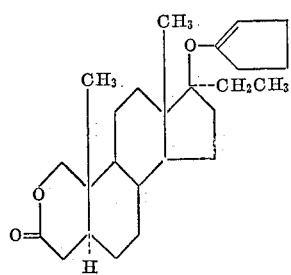

is obtained.

Example 15

The reaction of 3.14 parts of 17β-hydroxy-17α-methyl-2-oxa-5α-androstan-3-one with 41 parts of cyclohexanone dimethyl ketal by the procedure described in Example 13 results in 17β-cyclohex-1'-enyloxy-17α-methyl-2-oxa-5α-androstan-3-one of the structural formula

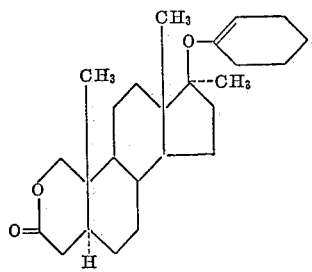

Example 16

To a solution of 5 parts of 17β-hydroxy-2-oxa-5α-androstan-3-one in 80 parts of acetone is added 20 parts of cyclopentyl iodide and 50 parts of silver carbonate. The resulting reaction mixture is stirred at room temperature until all of the organic halogen is destroyed, and the reaction mixture is then filtered. This procedure is repeated twice more with fresh cyclopentyl iodide and silver carbonate, 20 parts and 50 parts, respectively, each time, and the reaction mixture is filtered, then stripped of solvent at reduced pressure. The resulting residue is dissolved in 200 parts of methanol containing 100 parts by volume of 10% aqueous sodium hydroxide, and the resulting solution is heated at reflux. The solvent is removed by distillation under reduced pressure, and the resulting residue is diluted with water, then is filtered. The filtrate is acidified to pH 2 by means of hydrochloric acid, then is extracted with benzene. The benzene extracts are washed successively with dilute aqueous sodium hydroxide and water, dried over anhydrous sodium sulfate and evaporated to dryness at reduced pressure. This residue is adsorbed on a silica gel chromatographic column, then eluted with benzene and with benzene-ethyl acetate mixtures. The 1% ethyl acetate in benzene eluate affords a fraction which is recrystallized from hexane to yield 17β-cyclopentyloxy-2-oxa-5α-androstan-3-one, melting at about 157.5–158.5°. It is represented by the structural formula

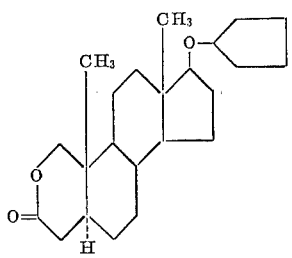

Example 17

The substitution of 5.24 parts of 17β-hydroxy-17α-methyl-5α-androstan-3-one and 21.4 parts of cyclohexyl iodide in the procedure of Example 16 results in 17β-cyclohexyloxy - 17α - methyl - 2 - oxa - 5α - androstan - 3-one of the structural formula

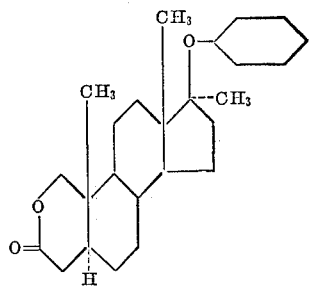

Example 18

The substitution of 5.48 parts of 17α-ethyl-17β-hydroxy-2-oxa-5α-androstan-3-one and 21.4 parts of cyclohexyl iodide in the procedure of Example 16 results in 17α - ethyl - 17β - cyclohexyloxy - 2 - oxa - 5α - androstan-3-one of the structural formula

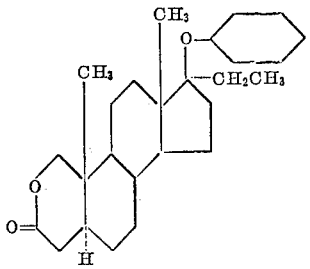

Example 19

By substituting 41 parts of cyclohexanone dimethyl ketal and otherwise proceeding according to the processes described in Example 13, 17β-cyclohex-1'-enyloxy-2-oxa- 5α-androstan-3-one is obtained. It is represented by the structural formula

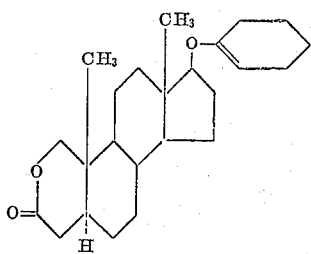

*Example 20*

The substitution of 21.4 parts of cyclohexyl iodide in the procedure of Example 16 affords 17β-cyclohexyloxy-2-oxa-5α-androstan-3-one of the structural formula

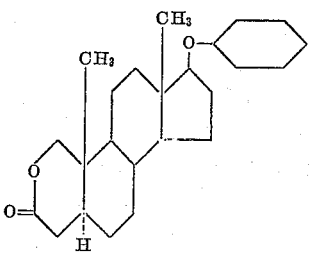

What is claimed is:
1. A compound of the formula

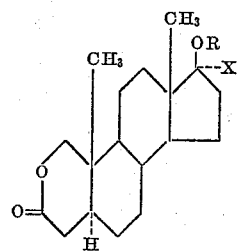

wherein X is selected from the group consisting of hydrogen and lower alkyl, and R is selected from the group consisting of tetrahydropyran-2-yl, lower cycloalkyl, lower cycloalk-1-enyl, and a radical of the formula

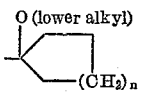

wherein n is a positive integer less than 3.
2. 17β - tetrahydropyran - 2 - yloxy - 2 - oxa - 5α - androstan-3-one.
3. 17β - cyclopent - 1' - enyloxy - 2 - oxa - 5α - androstan-3-one.
4. 17β-cyclopentyloxy-2-oxa-5α-androstan-3-one.
5. 17β - [(1 - ethoxycyclopentyl)oxy] - 2 - oxa - 5α-androstan-3-one.
6. 17β - cyclohex - 1' - enyloxy - 2 - oxa - 5α - androstan-3-one.
7. 17β-cyclohexyloxy-2-oxa-5α-androstan-3-one.
8. A compound of the formula

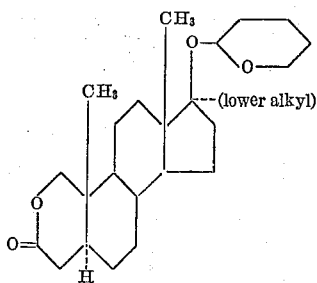

9. 17α - methyl - 17β - tetrahydropyran - 2 - yloxy - 2-oxa-5α-androstan-3-one.
10. A compound of the formula

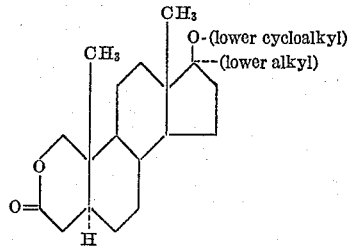

11. A compound of the formula

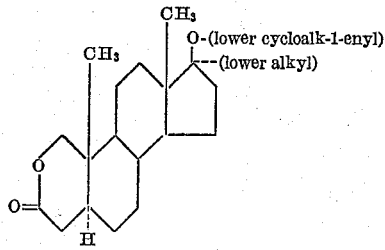

12. A compound of the formula

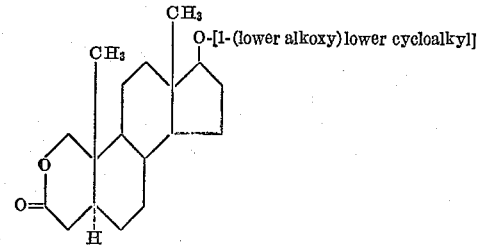

No references cited.